Figure 1:
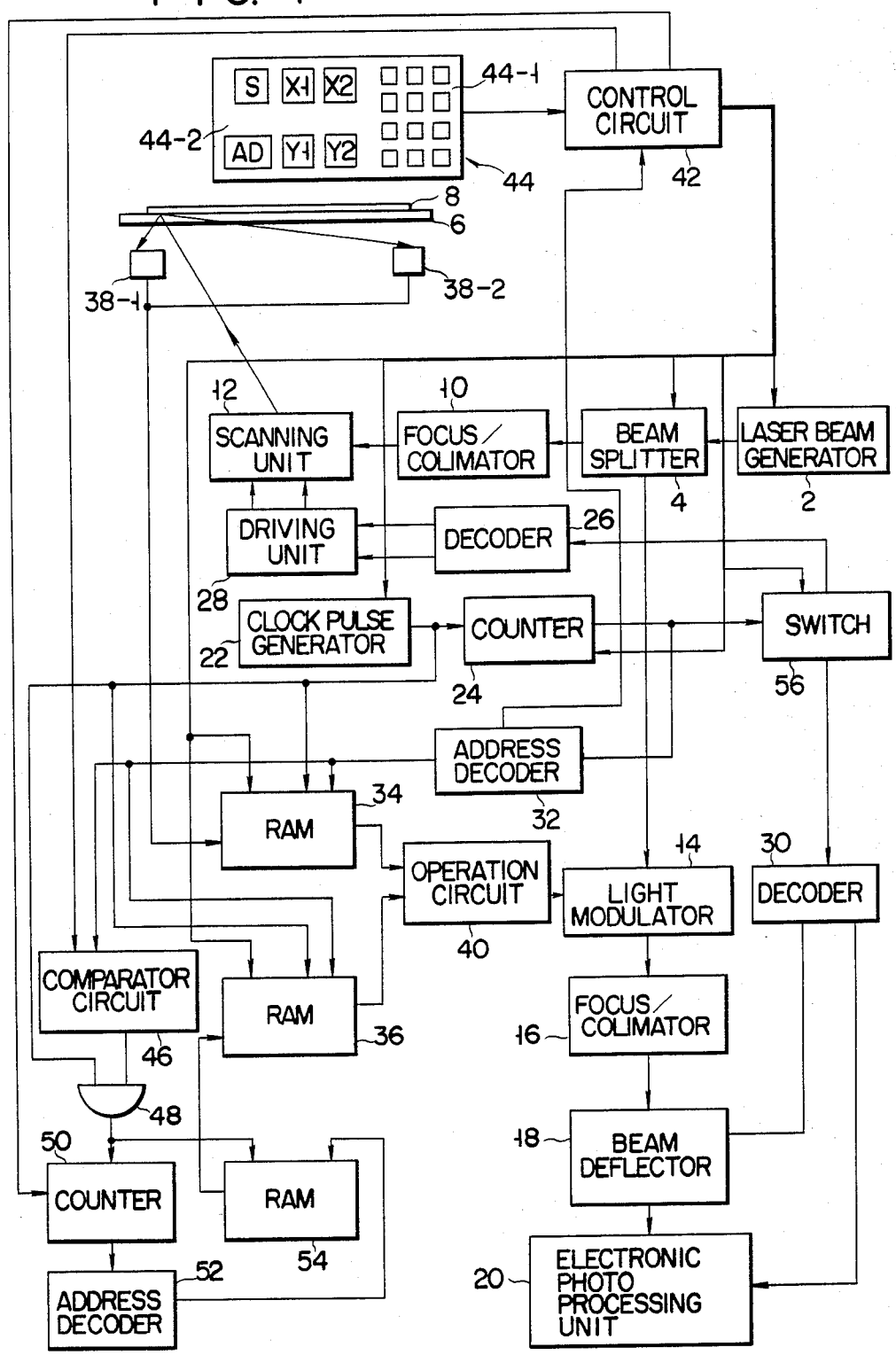

United States Patent [19]

Nagoh

[11] Patent Number: 4,495,521
[45] Date of Patent: Jan. 22, 1985

[54] ELECTRONIC COPYING APPARATUS

[75] Inventor: Chiaki Nagoh, Yokohama, Japan

[73] Assignee: Tokyo Shibaura Denki Kabushiki Kaisha, Kawasaki, Japan

[21] Appl. No.: 421,280

[22] Filed: Sep. 22, 1982

Related U.S. Application Data

[63] Continuation of Ser. No. 195,425, filed as PCT JP 79/00170, Jun. 30, 1979, § 102(e) date Mar. 13, 1980, abandoned.

[30] Foreign Application Priority Data

Jul. 13, 1978 [JP] Japan .................................. 53-85627

[51] Int. Cl.³ .......................... H04N 1/38; H04N 1/40
[52] U.S. Cl. ...................................... 358/256; 358/280
[58] Field of Search .................. 358/78, 256, 183, 280

[56] References Cited

U.S. PATENT DOCUMENTS 3,828,319  8/1974  Owen et al. ......................... 358/256
3,904,816  9/1975  Taudt et al. ......................... 358/256
4,231,069 10/1980  Wellendorf et al. ................ 358/280
4,240,119 12/1980  Norton et al. ....................... 358/256

OTHER PUBLICATIONS

Schrieber—Image Processing—IEEE Proc—vol. 66 #12 1978 pp. 1640–1651.

*Primary Examiner*—Joseph A. Orsino, Jr.
*Attorney, Agent, or Firm*—Cushman, Darby & Cushman

[57] ABSTRACT

There is provided an electronic copying apparatus which scans an original with a scanning laser beam, modulates an exposure laser beam with an electric signal corresponding to the light reflected from the original, applies the modulated laser beam onto a sensitive member of an electronic photograph processing unit, thereby providing a copy of the original. External data are superposed on the data corresponding to the electric signal, and the exposure laser beam is modulated according to the superposed data, thereby making a copy containing the external data in addition to the information on the original.

3 Claims, 3 Drawing Figures

ELECTRONIC COPYING APPARATUS

This is a continuation of application Ser. No. 195,425 filed as PCT JP79/00170 Jun. 30, 1979, 102(e) dated Mar. 13, 1980, to be abandoned as of the filing date accorded this application.

1. TECHNICAL FIELD

This invention relates to an electronic copying apparatus.

2. BACKGROUND ART

Generally, an electronic copying apparatus is so constituted as to scan an original with light from a highly intense light source and guide the light reflected from the original to a photosensitive member of an electronic photograph processing unit through an optical system including lenses, thereby providing a copy of the original. In this case, the information on the original is faithfully reproduced without being increased or decreased. In some cases it is required that a part of the information on the original be deleted or that other information be added to the information on the original. Such a function could not be expected of a known electronic copying apparatus. Further, the known electronic copying apparatus uses a highly intense light source such as a halogen lamp, and its power consumption amounts to several hundred watts. It would therefore be desirable to reduce power comsumption.

An object of this invention is to provide an electronic copying apparatus which can copy information prepared by deleting a part of the information on an original or by adding other data to the information on the original.

3. DISCLOSURE OF INVENTION

According to this invention there is provided an electronic copying apparatus which comprises optical scanning means for scanning an original with a light spot, photoelectric converting means for converting light reflected from the original into an electric signal, data processing means for receiving the electric signal and a new data signal from a data generating means and producing a combined signal, light modulating means which is controlled by the combined signal from the data processing means for modulating incident light, and electronic photograph processing means for carrying out copying operation in accordance with modulated light from the light modulating means.

4. BRIEF DESCRIPTION OF DRAWINGS

Figure 2:
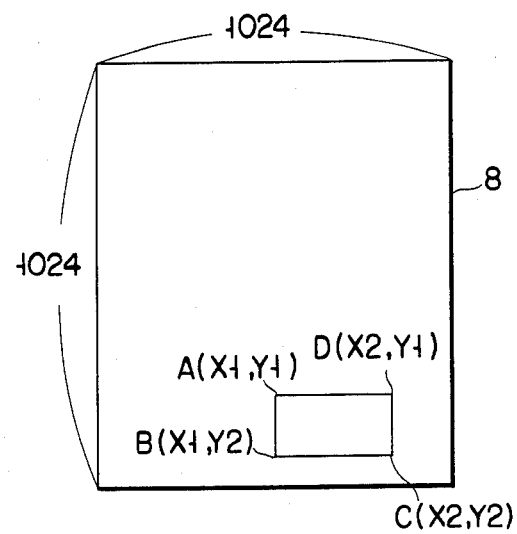
Figure 3:
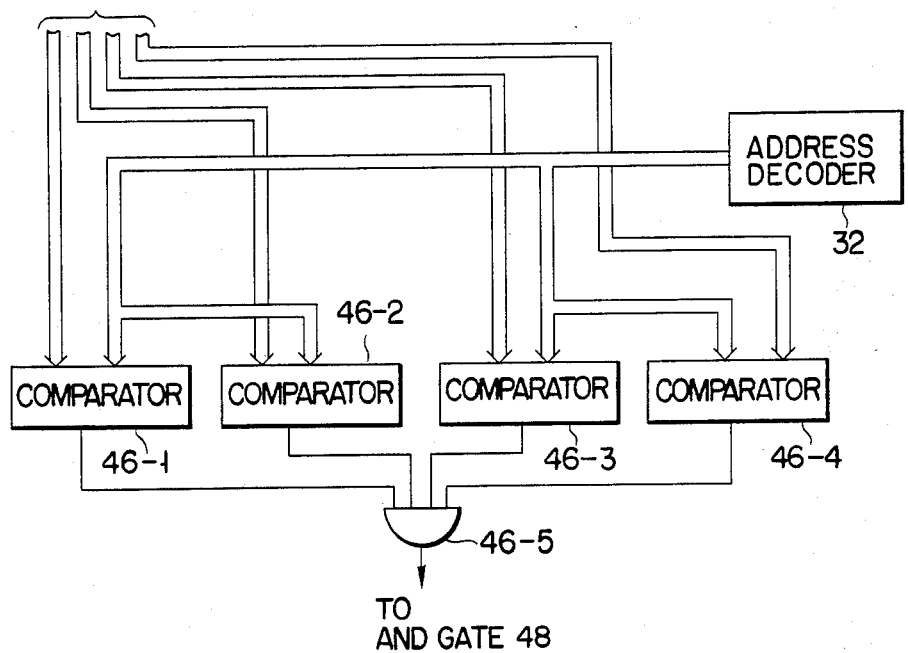

FIG. 1 is a circuit diagram of an electronic copying apparatus according to one embodiment of this invention, FIG. 2 shows an original which is used in the electronic copying apparatus of FIG. 1, and FIG. 3 is a circuit diagram illustrating in detail a comparator circuit used in the electronic copying apparatus of FIG. 1.

5. BEST MODE OF CARRYING OUT THE INVENTION

FIG. 1 is a circuit diagram of an electronic copying apparatus according to one embodiment of this invention. The electronic copying apparatus includes a laser beam generator 2 for generating a laser beam, a beam splitter 4 for directing the laser beam from the laser beam generator 2 in a first direction or a second direction, a focus/collimator 10 for receiving the laser beam from the laser beam generator 2, which has been directed in the first direction by the beam splitter 4 and for focusing the laser beam and setting the position of the beam on an original 8 laid on an original table 6, and a scanning unit 12 for scanning the original 8 in a raster pattern, using the laser beam coming from the laser beam generator 2 through the beam splitter 4 and the focus/collimator 10. The laser beam directed in the second direction by the beam splitter 4 is transferred to an electronic photograph processing unit 20 through a light modulator 14, a focus/collimator 16 and a beam deflector 18.

The electronic copying apparatus further includes a clock pulse generator 22, a counter 24 for counting clock pulses from the clock pulse generator 22, a decoder 26 for generating, according to the contents of the counter 24, an X-axis signal and a Y-axis signal which represent X-axis position and Y-axis position of a point on the original to be scanned, and a drive unit 28 for driving the scanning unit 12 in response to the X-axis and Y-axis signals from the decoder 26. A decoder 30 decodes the contents of the counter 24 and supplies an X-axis signal to the beam deflector 18 and a Y-axis signal to the electronic photograph processing unit 20.

An address decoder 32 decodes the contents of the counter 24 and supplies an address signal to random access memories (RAMs) 34 and 36 having, for example, the same memory capacity. The RAM 34 is supplied with output signals of photo-electric converters 38-1 and 38-2 which are arranged to face the original table 6, which receive a laser beam applied onto the original 8 by the scanning unit 12 and reflected from the original 8 and which convert the received laser beam into, for instance, a logic signal "0" or "1". The output data of the RAMs 34 and 36 are arithmetically processed by an arithmetic operation circuit 40 to form a modulation signal, which is supplied to the light modulator 14.

A control circuit 42 generates various control signals in response to key signals from a keyboard 44 which has ten keys 44-1 and operation keys 44-2. A coordinate signal, which the control circuit 42 generates in response to key signals from the keyboard 44 in such a manner as will be described later, is compared by a comparator circuit 46 with an address signal from the address decoder 32. The output signal of the comparator circuit 46 is supplied to a presettable counter 50 via an AND gate 48 which receives at one input terminal a clock pulse from the clock pulse generator 22. In response to the output signal of the presettable counter 50 an address decoder 52 supplies an address signal to a RAM 54. Into the RAM 54 desired data have been written by means of an external circuit (not shown). The output data of the RAM 54 are supplied to the RAM 36. Under control of a control signal from the control circuit 42, a switch 56 supplies the output data of the counter 24 alternatively to the decoder 26 or the decoder 30.

FIG. 2 shows the original 8. In this embodiment, the information on the original 8 is expressed by $1024 \times 1024$ picture elements. A region ABCD of the original 8 is designated by coordinate signals which the control circuit 42 generates when the operation keys $X_1$, $X_2$, $Y_1$ and $Y_2$ and ten keys of the keyboard 44 are operated.

FIG. 3 illustrates in detail how the address decoder 32 and the comparator circuit 46 both shown in FIG. 1 are connected. The address decoder 32 produces a 20-bit address signal, the upper ten bits of which represent a Y-axis position and the lower ten bits of which represent an X-axis position. The lower ten bits from the address decoder 32 are supplied to comparators 46-1 and 46-2, and the upper ten bits to comparators 46-3 and 46-4. An $X_1$ coordinate generated by the control circuit upon operation of the operation key $X_1$ and the ten keys 44-1 is supplied to the comparator 46-1. An $X_2$ coordinate, a $Y_1$ coordinate and a $Y_2$ coordinate which the control circuit 42 produces when the operation keys $X_2$, $Y_1$ and $Y_2$ are operated together with the keys 44-1 are supplied to the comparators 46-2, 46-3 and 46-4, respectively. The comparator 46-1 generates a high level output signal when it detects that an X coordinate from the address decoder 32 is larger than an $X_1$ coordinate from the control circuit 42. The comparator 46-2 generates a high level output signal when it detects that an X coordinate from the address decoder 32 is smaller than an $X_2$ coordinate from the control circuit 42. Further, the comparator 46-3 generates a high level output signal when it detects that a Y coordinate from the address decoder 32 is larger than a $Y_1$ coordinate from the control circuit 42. The comparator 46-4 produces a high level output signal when it detects that a Y coordinate from the address decoder 32 is smaller than a $Y_2$ coordinate from the control circuit 42. These comparators 46-1 to 46-4 are coupled to an AND gate 46-5 whose output terminal is connected to the AND gate 48. Thus, the AND gate 46-5 generates a high level signal when the address signal from the address decoder 32 represents a position within the region ABCD.

Now it will be described how the electronic copying apparatus shown in FIG. 1 operates.

Suppose the desired data stored in the RAM 54 are to be added to the information on the original 8 and that a copy having both the information and the data is to be made. First, the operation key AD and ten keys 44-1 of the keyboard 44 are operated, thus presetting in the counter 50 a member related to the address of RAM 54 at which the addition data stored. The address data thus preset in the counter 50 is decoded by the address decoder 52 so as to designate the first address location of the RAM 54, where the desired data are stored. Then, keys $X_1$, $X_2$, $Y_1$ and $Y_2$ are operated with the keys 44-1, thereby causing the control circuit 42 to produce coordinate signals in the above-mentioned manner designating the position of a copy paper (not shown), where the desired data are to be copied. When an operation key S, i.e. copy-starting key, is operated under these circumstances, the control circuit 42 supplies a control signal to the laser beam generator 2, the beam splitter 4, the clock pulse generator 22, the RAMs 34 and 36, and the switch 56. As a result, the laser beam generator 2 generates a laser beam, the beam splitter 4 is set at a first position and guides the laser beam from the laser beam generator 2 to the original 8 through the focus/collimator 10 and the scanning unit 12. The clock pulse generator 22 produces clock pulses, and the contents of the counter 24 are supplied to the decoder 26 via the switch 56. According to the X-axis and Y-axis signals from the decoder 26 the drive unit 28 drives the scanning unit 12. And the RAMs 34 and 36 are put into write mode by the control signal from the control circuit 42. The address terminals of the RAMs 34 and 36 are supplied with an address signal from the address decoder 32 which decodes the output signal of the counter 24. As a result, the laser beam generated by the laser beam generator 2, applied onto the original 8 by means of the scanning unit 12 and reflected from the original 8 is converted by the photo-electric converters 38-1 and 38-2 into an electric signal, which is written into the RAM 34 at the address location corresponding to that position on the original 8 at which the laser beam has been reflected. As long as scanning occurs outside of the region ABCD as shown in FIG. 2, the AND gate 48 generates no pulse, and the additional data to be inserted in this regions will not be read out from the RAM 54. Consequently, data indicative of "blank space" are written into the RAM 36.

The scanning unit 12 continues scanning. When the scanning beam reaches point A of the region ABCD, or when the address signal from the address decoder 32 designates the address location of point A, the AND gate 48 generates a pulse as mentioned above. Those of the desired data which are stored in the first address location are then read out from the RAM, 54. At the same time, the contents of the counter 50 increase by "1", thus designating the second address location of the RAM 54. The data are then read out from the second address location of the RAM 54 and supplied to the RAM 36. They are written into the address location of the RAM 36 which corresponds to point A. Thereafter the desired data are read out from the RAM 54 every time the AND gate 48 produces a pulse. The data are therefore written successively into the address locations of the RAM 36 which correspond to the region ABCD. Of course, also in this case, the information on the original 8 is successively written into the RAM 34.

The scanning unit 12 keeps on scanning further. When the last point of the original 8 is scanned, or when the address signal from the address decoder 32 designates the last address location (1026, 1026), the control circuit 42 gives the counter 24 a reset signal, thus holding the counter 24 in a reset state for a predetermined time. At the same time, it supplies control signals to the beam splitter 4, the RAMs 35 and 36 and the switch 56. As a result, the beam splitter 4 is set at a second position to guide the laser beam from the laser beam generator 2 to the light modulator 14. The RAMSs 34 and 36 are set to a reading mode and the switch 56 is set at a second position so that the contents of the counter 24 can be decoded by the decoder 30.

When the counter 24 is released from the reset state, it starts counting clock pulses from the clock pulse generator 22. The address decoder 32 decodes the contents of the counter 24 and supplies an address signal to the RAMs 34 and 36. The data are therefore read out from the address locations of the RAMs 34 and 36 which have been designated by the address signal from the address decoder 32. As long as no address locations within the region ABCD are designated, the RAM 36 reads out data indicative of "blank space", while the RAM 34 reads out the data which correspond to the information on the original 8. The data read out from the RAMs 34 and 36 are supplied to the arithmetic operation circuit 40 which sums the data. Since "blank space" data are read out from the RAM 36, the arithmetic operation circuit 40 produces output data which are identical with the data read out from the RAM 34, i.e. data corresponding to the information on the original 8. The output data of the arithmetic operation circuit 40 are supplied to the light modulator 14. Modulator 14 modulates the intensity of the laser beam coming from the laser beam generator 2 through the beam splitter 4 in accordance with the output data of the circuit 40.

The laser beam thus modulated by the light modulator 14 is transferred to the beam deflector 18 via the focus/collimator 16. According to the X-axis data from the decoder 30 the beam deflector 18 deflects the laser beam in the X direction, thus applying the laser beam onto a photosensitive member (not shown) of the electronic photograph processing unit 20. The electronic photograph processing unit 20 moves the photosensitive member in Y direction in accordance with the Y-axis data from the decoder 30.

The RAMs 34 and 36 read out the data in sequential storage locations. When an address signal from the address decoder 32 designates the address location corresponding to point A in the region ABCD, effective data is read out from the RAM 36, and data corresponding to the information on the original 8 is read out from the RAM 34. The data read out from the RAM 36 are added to the data from the RAM 34 by means of the arithmetic opration circuit 40. As long as the address signals from the address decoder 32 designate the address locations corresponding to any points in the region ABCD, the RAM 36 reads out effective data, which are added to the data read out from the corresponding address locations of the RAM 34. Thus, the arithmetic operation circuit 40 produces output data including the information on the original 8 and the desired data stored in the RAM 54. The sensitive member of the electronic photograph processing unit 20 is exposed to the laser beam in accordance with the information on the original 8, and the region of the photosensitive member which corresponds to the region ABCD of the original 8 is exposed to the laser beam in accordance with the sum of the information on the original 8 and selected one or ones of the data stored in the RAM 54.

This invention has been described with reference to one embodiment. The invention is not limited to this embodiment. For example, the arithmetic operation circuit 40, which is described to have OR function, may be constituted by an AND circuit. If the circuit 40 is an AND circuit, data "0" is stored in a given address region of the RAM 36, and data "1" in any other address region thereof, whereby the information on the original 8 can be copied, except for the data on the region which corresponds to the given address region of the RAM 36. Moreover, the arithmetic operation circuit 40 may be provided with both an OR function and an AND function, and the keyboard 44 may be provided with selection keys, one for selecting OR function of the circuit 40 and the other for selecting AND function of the circuit 40.

Further, two laser beam generators may be used, thus omitting the beam splitter 4.

Still further, it is possible to read desired data from the RAM 54 and write them into desired address locations of the RAM 34, by operating the keyboard after all the information on the original 8 has been written into the RAM 34. In this case, the RAM 36 and the arithmetic operation circuit 40 can be dispensed with.

6. INDUSTIRAL APPLICABILITY

As described above, an electronic copying apparatus according to this invention is suitable for copying information by deleting a part of the information on an original or by adding other data to the information on the original.

I claim:

1. An electronic copying apparatus comprising:
    optical scanning means for scanning an original;
    photo-electric converting means for converting light reflected from the original into an electric signal;
    data generating means including random access memory means for storing data for insertion or deletion on a copy;
    first memory means for storing electric signals from said photo-electric converting means;
    second memory means for storing data signals from said data generating means random access memory, said second memory means having substantially the same memory capacity as said first memory means;
    a single address designating circuit producing an address signal which is supplied to said first and second memory means to commonly designate addresses for said first and second memory means;
    means for processing data read out from said first and second memory means;
    keyboard means for generating indications of address locations on said copy at which data stored in said random access memory means is to be inserted or deleted;
    data transfer control means including means for comparing said address signal from said single address designating circuit and said indications from said keyboard means and generating a comparison signal when detecting that an address corresponding to said address signal resides in a range defined by said indications of address locations, and means for sequentially addressing locations in said random access memory means in synchronism with changes in the output of said single address designating circuit in response to said comparison signal thereby permitting data to be sequentially transferred from said data generating means random access memory means to said second memory means;
    light modulating means for modulating incident light in accordance with an output signal of said processing means; and
    electronic photographic processing means for disposing an image in accordance with said modulated incident light on said copy.

2. The electronic copying apparatus according to claim 1, wherein said original (8) is scanned with a light spot.

3. An electronic copying apparatus as in claim 1 wherein:
    said single address designating circuit comprises:
        means for generating a plurality of pulses,
        first means for counting pulses from said generating means, and
        first decoding means, responsive to said first counting means for addressing said first and second memory means; and
    said sequential addressing means comprises:
        gate means for passing said generating means pulses to said gate means output in response to said comparison signal,
        second means for counting pulses from said gate means output, and
        second decoding means, responsive to said second counting means for addressing said random acess memory means.

* * * * *